United States Patent [19]

Bornemisza et al.

[11] Patent Number: 5,237,817
[45] Date of Patent: Aug. 24, 1993

[54] GAS TURBINE ENGINE HAVING LOW COST SPEED REDUCTION DRIVE

[75] Inventors: Tibor Bornemisza; George Hosang, both of San Diego, Calif.

[73] Assignee: Sundstrand Corporation, Rockford, Ill.

[21] Appl. No.: 838,370

[22] Filed: Feb. 19, 1992

[51] Int. Cl.⁵ .............................................. F02K 3/02
[52] U.S. Cl. ................................... 60/226.1; 60/39.2; 415/229; 475/196
[58] Field of Search .......................... 60/226.1, 39.2; 415/229; 74/DIG. 5; 475/196

[56] References Cited

U.S. PATENT DOCUMENTS

| | | | |
|---|---|---|---|
| 3,071,691 | 1/1963 | Haddad et al. | 290/52 |
| 3,247,393 | 4/1966 | Toesca | 290/52 |
| 3,264,482 | 8/1966 | Clark et al. | 290/38 |
| 3,390,928 | 7/1968 | Davies et al. | 415/229 |
| 3,421,686 | 1/1969 | Coplin et al. | 415/229 |
| 3,477,315 | 11/1969 | Macks | 475/196 |
| 3,534,557 | 10/1970 | Petrie et al. | 415/229 |
| 3,754,484 | 8/1973 | Roberts | 74/801 |
| 3,792,586 | 2/1974 | Kasmarik et al. | 60/226.1 |
| 3,814,549 | 6/1974 | Cronstedt | 60/39.28 |
| 4,005,575 | 2/1977 | Scott et al. | 60/226.1 |
| 4,490,622 | 12/1984 | Osborn | 290/52 |
| 4,563,129 | 1/1986 | Pagluica | 416/129 |
| 4,815,273 | 3/1989 | Rudolph | 60/39.161 |
| 4,827,712 | 5/1989 | Coplin | 60/226.1 |
| 4,900,221 | 2/1990 | Ciokaijlo et al. | 60/226.1 |
| 5,061,228 | 10/1991 | Hagqvist | 475/196 |

Primary Examiner—Richard A. Bertsch
Assistant Examiner—Howard R. Richman
Attorney, Agent, or Firm—Wood, Phillips, VanSanten, Hoffman & Ertel

[57] ABSTRACT

The cost and bulk of a speed reducing transmission required to provide low speed rotational power from a gas turbine engine is avoided by employing bearings (16, 18) jornalling a high speed shaft (12) of the engine with a power takeoff in the form of a tubular shaft (62) having bearing receiving and retaining openings (82) to act as a bearing cage for bearing elements (64, 66) disposed between inner and outer bearing races (68, 70). Upon rotation of the high speed shaft (12), the bearing elements (64, 66) will move in an epicyclic fashion thereby driving the tubular shaft (62) at a reduced rotational rate allowing it to drive loads such as a dynamoelectric machine (90) or a ducted fan (48) at rotational speeds less than the rotational speed of the high speed shaft (12).

13 Claims, 2 Drawing Sheets

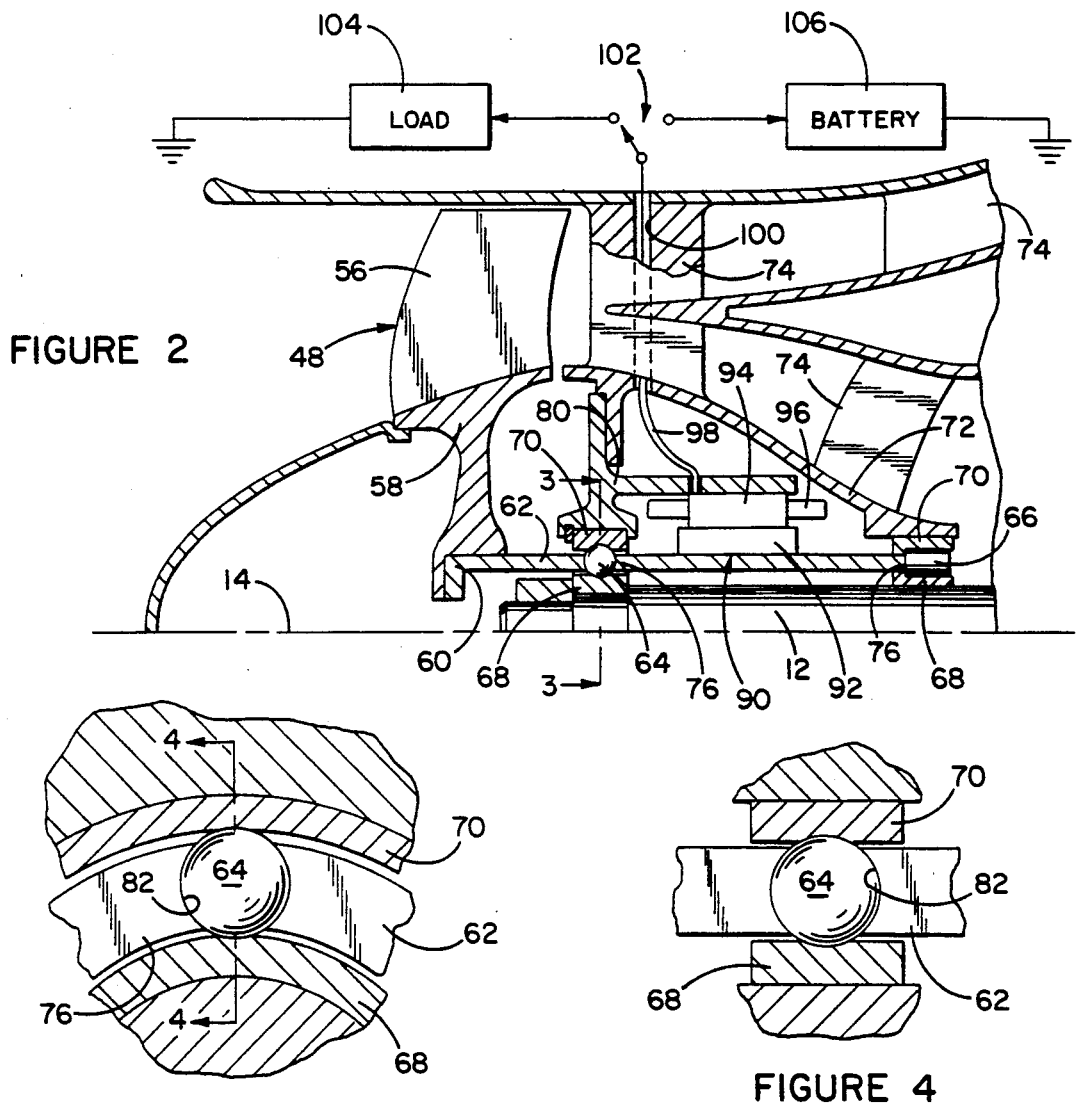

GAS TURBINE ENGINE HAVING LOW COST SPEED REDUCTION DRIVE

FIELD OF THE INVENTION

This invention relates to gas turbine engines, and more particularly, to gas turbine engines having a high speed output shaft and which are required to drive a load at a lower rotational speed than the rate of rotation of the output shaft.

BACKGROUND OF THE INVENTION

Gas turbine engines are commonly used to perform work, either as thrust generating engines or as engines providing rotational power via a transmission connected to the output shaft of the gas turbine engine. Even when the engine is operating as a thrust producing engine, there is frequently a need to provide some means of taking power off a high speed shaft being driven by a turbine wheel forming part of the engine. For example, it may be desirable to utilize rotational power to drive a pump or a generator, or the like. Alternatively, in thrust engines of the type known as ducted fan turbojet engines, a fan is rotationally driven as a consequence of engine operation. As is well-known, many gas turbine engines provide very high rotational speeds. In a number of instances, such speeds are excessive in terms of driving other elements as, for example, the rotor of a dynamoelectric machine or a ducted fan. In the case of the former, high rotational rates create large centrifugal forces acting against components of the dynamoelectric machine rotor which tend to cause it to fly apart. If structurally reinforced sufficiently to resist such forces, frequently, efficiency of the dynamoelectric machine is considerably reduced, usually as a result of an undesirable increase in the effective air gap between the rotor and the stator.

In the case of ducted fans, fan tip speed may be of substantial concern in terms of aerodynamic considerations affecting fan efficiency. Consequently, in virtually all ducted fan machines known today, some sort of a speed reduction coupling is established between the high speed shaft of the gas turbine engine and the ducted fan. In the usual case, the speed reduction coupling is in the form of a planetary gear transmission. Not only are these transmissions expensive to fabricate, they also may be of considerable bulk and weight and undesirably increase the size and weight of the engine as well as the cost thereof.

The present invention is directed to providing a speed reducing coupling that may be employed between the high speed shaft of a gas turbine engine and a load which is inexpensive to manufacture, of minimal bulk and weight.

SUMMARY OF THE INVENTION

It is the principal object of the invention to provide a new and improved gas turbine engine for a power plant. More specifically, it is an object of the invention to provide such an engine or power plant wherein means are provided for driving a load at a relatively slow speed in response to the rotation of a high speed shaft in a gas turbine engine, which means are of low cost, low bulk and low weight.

An exemplary embodiment of the invention achieves the foregoing object in a power plant which comprises a gas turbine engine having a high speed output shaft. At least one bearing journals the shaft and has a bearing cage rotatable relative to the shaft at a speed less than the high speed. The bearing cage is driven by substantially epicyclic movement of bearing elements of the bearing when the high speed shaft is driven. A load to be driven at low speed is coupled to the bearing cage to be driven thereby.

In one embodiment, the load is a ducted fan such that the gas turbine engine may be employed as a ducted fan turbojet, thrust producing engine.

The invention contemplates that in the alternative or in addition thereto, the load may be a dynamoelectric device having its rotor coupled to the bearing cage.

In a highly preferred embodiment, the dynamoelectric machine can be driven by the bearing cage and thus act as a generator. In the alternative, it may drive the bearing cage when it is connected to a source of electrical power to thereby serve as a starter for the gas turbine engine. A source of electrical power is provided for the dynamoelectric machine.

In a highly preferred embodiment, the load includes both the dynamoelectric machine and the ducted fan.

The invention contemplates that the gas turbine engine include a compressor, a turbine wheel and a shaft coupling the compressor and the turbine wheel. The bearing includes an inner race, an outer race, bearing elements between the races, and a bearing cage for separating the bearing elements between the races. A combustor is located to receive compressed air from the compressor and fuel from a source to provide gases of combustion for driving the turbine wheel.

Preferably, the bearing cage includes a circular element disposed about the shaft between the races and having a plurality of bearing element capturing openings about its periphery, one for each bearing element. The coupling means comprises a tube disposed about the shaft and connected to the bearing cage.

In a preferred embodiment, there are two of such bearings in axially spaced relation along the shaft. The coupling means again comprises a tubular shaft surrounding the shaft and extending between the cages of both the bearings. Preferably, the tubular shaft further defines at least one of the bearing cages.

In a highly preferred embodiment, the bearing or bearings are located on the side of the compressor opposite the turbine wheel to thereby be on the cold side of the engine.

Other objects and advantages will become apparent from the following specification taken in connection with the accompanying drawings.

DESCRIPTION OF THE DRAWINGS

FIG. 2 is a fragmentary, enlarged sectional view of part of the engine;

FIG. 3 is a fragmentary, sectional view of a ball bearing that may be utilized in practicing the invention;

FIG. 4 is a fragmentary, sectional view taken approximately along the line 4—4 in FIG. 3; and FIG. 5 is a view similar to FIG. 4, but of a modified embodiment of the invention.

DESCRIPTION OF THE PREFERRED EMBODIMENT

Figure 1:
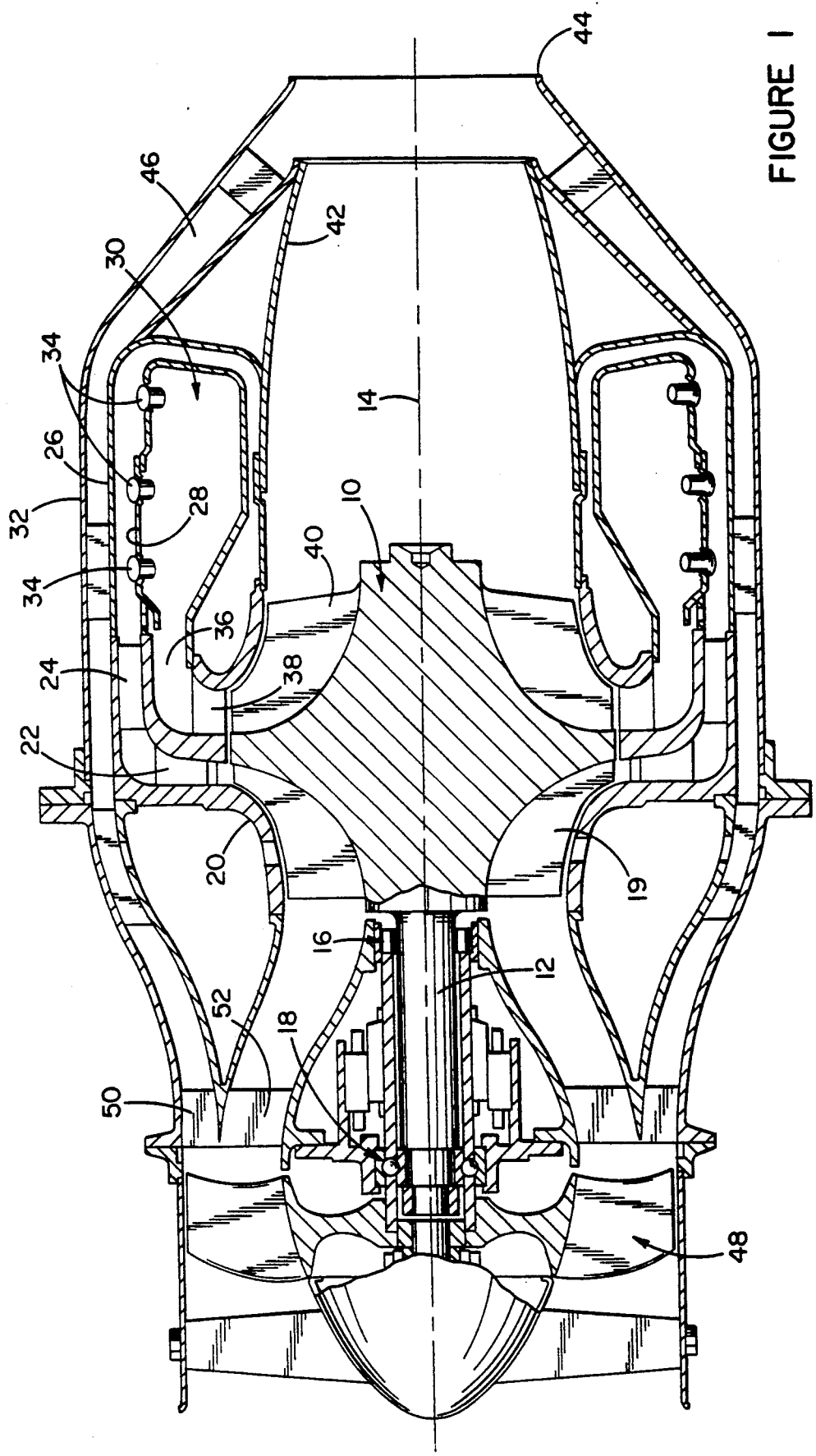
FIG. 1 is a sectional view of a ducted fan, turbojet thrust producing engine made according to the invention.

An exemplary embodiment of the invention is illustrated in FIG. 1 in the context of a radial flow, ducted fan gas turbine thrust producing engine, that is, a ducted fan turbojet. However, it is to be understood that the invention may be employed with efficacy in axial turbine arrangements as well. Further, the invention is not limited to ducted fan type turbines, but may be used in any instance where the gas turbine engine is intended to rotationally drive a load, which load must be driven at a lesser rotational rate than the rate of rotation of the rotor.

With that in mind, it will be seen that the gas turbine engine includes a rotor, generally designated 10, of the so-called "monorotor" construction Such a construction, preferably of ceramic material, is preferred for cost and performance virtues. However, a separate compressor and turbine wheel coupled by a shaft may be used in lieu thereof. The rotor 10 includes an output shaft 12 which in turn is journalled for rotation about an axis 14 by a roller bearing assembly 16 and a ball bearing assembly 18 which are axially spaced from one another along the shaft 12.

On the shaft side, the rotor 10 includes a plurality of radial discharge compressor blades 19 rotatable in proximity to a shroud 20 to compress and discharge compressed air into a vaned diffuser 22. The vaned diffuser 22 in turn discharges compressed air into a deswirler vane assembly 24 located between a wall 26 and the radially outer wall 28 of an annular combustor, generally designated 30. The wall 26 in turn is surrounded by a housing wall 32 or turbine case.

The combustor 30 is adapted to receive compressed air from the compressor blades 19 via airblast tubes 34 and fuel from a source (not shown) to generate gases of combustion. The gases of combustion are discharged from the combustor 30 via an outlet 36 to an annular nozzle 38. The nozzle 38 directs the gases of combustion against blades 40 on the rotor 10. The blades 40 along with the right hand side of the rotor 10 define a rotatable turbine wheel. Thus, rotational energy imparted to the rotor 10 serves to provide the energy required to drive the blades 19 to provide compressed air to operate the system.

The gases of combustion are then discharged out of a thrust producing nozzle 42.

It will be observed that the housing or turbine case 32 is generally spaced from the wall 26 along the length of the latter and terminates in a nozzle structure 44 of its own. The annulus between the walls 26 and 32 is given the reference numeral 46 and serves as a bypass duct for the flow of air which is somewhat compressed by a ducted fan, generally designated 48, located forwardly of the compressor blades 19. The ducted fan, as will be seen, rotates at a rate less than the rate of rotation of the shaft 12, but is ultimately driven as a result of rotation of the rotor 10 about the axis 14. The ducted fan discharges into an entrance area 50 for the annulus 46 as well as an entrance area 52 which is on the inlet side of the compressor blades 38.

Turning now to FIG. 2, the ducted fan 48 is seen to include a plurality of blades 56 (only one of which is shown in FIG. 2) mounted on a rotatable hub 58. The hub 58 is secured by any suitable means to an end 60 of a tubular shaft 62. The tubular shaft 62 is concentric with the shaft 12 and in spaced relation with respect thereto. The shaft 62 is driven by substantially epicyclic movement of ball bearing elements 64 within the bearing 18 and roller bearing elements 66 within the bearing 16. Substantially epicyclic movement as used herein includes true epicyclic movement and deviation therefrom resulting from normal kinematic interfacial traction (friction) forces arising from minor differences in velocities of contacting surfaces, or when lubrication of one form or another exists, the near contact between surfaces that is necessary to transmit torque through the bearings.

More specifically, the bearing 16 includes an inner race 68 affixed to or an integral part of the shaft 12 and a radially spaced outer race 70 which is stationery and affixed to a housing wall 72 supported by struts 74 which extend to the case 32.

The roller bearing elements 66 (only one of which is shown in FIG. 2) are disposed between the two races 68 and 70 and, as is well known, a bearing cage or separator 76 is employed to maintain circumferential spacing between the roller bearing elements 66 when they are between the races 68 and 70.

Similarly, the bearing 18 includes an inner race 68 rotatable with the shaft 12, an outer race 70 that is fixed to a part 80 of the housing, interposed bearing elements 64 in the form of balls and a bearing cage 76 for separating the balls 64 in the circumferential direction. In a preferred embodiment, the cages 76 are conventionally configured simply by locating bearing element capturing openings 82 in a tubular shaft 62. In this regard, the wall thickness of the shaft 62 must be less than the spacing between the races 68 and 70, but the openings 82 may be formed in conventional shapes so as to allow rotation of the bearing elements 64 or 66 within the respective openings 82 and yet provide the desired spacing.

By forming the openings 82 in the tubular shaft 62, there is an inherent coupling of the cages 76 to the tubular shaft 62, and thus to the blades 56 of the ducted fan 48. Those skilled in the art will immediately appreciate that upon rotation of the shaft 12, the inner races 68 will rotate therewith. Such rotation will result in substantially epicyclic movement of the bearing elements 64, 66 about the axis 14 of the shaft 12 which in turn will rotate the bearing cages 76, that is, the shaft 62 at approximately 40% of the rate of rotation of the shaft 12. The exact gear ratio may be selected by judiciously altering the circumference of the bearing elements 64, 66 in relation to the outer diameter of the inner race 68 and the inner diameter of the outer race 70.

In any event, because the blades 56 are ultimately coupled to the tubular shaft 62 which is rotating as a result of such epicyclic bearing element movement, the blades 56 will be driven to perform the function of a ducted fan in a ducted fan turbojet engine.

In a preferred embodiment of the invention, a dynamoelectric machine, generally designated 90, includes a rotor 92 that is driven by the tubular shaft to rotate relative to a stator 94 supported by the housing port 80. In a preferred embodiment, the rotor 92 is made up of a series of permanent magnets while the stator 94 includes windings 96. As a consequence, electrical current will be induced in the windings 96. By means of leads 98 extending through a conduit 100 in one of the vanes 74, the windings 96 are in electrically conducting relation with a switch 102. In the position illustrated, the switch 102 is thrown to a load 104 to provide electrical power thereto. The switch 102 will be thus configured when the gas turbine engine is operational and employed for the purpose of providing electrical power to the load 104. As an alternative, the switch 102 may be thrown to a battery 106 which serves a source of electrical energy. The switch 102 will be thrown to the battery 106 when it is desired to cause the dynameoelectric machine 90 to operate as a motor rather than a generator. In such a case, current flowing through the windings 96 will cause rotation of the rotor 92 relative thereto and this mode of operation may be utilized when it is desired to start the gas turbine. In other words, in this mode of operation, the dynamoelectric machine 90 is operating as a starter motor for the gas turbine engine.

Of course, it should be understood that the reduced speed output on the shaft 62 may be used to drive other devices requiring a rotational input.

The use of roller bearings 66 immediately adjacent to the rotor 10 as illustrated is desirable since that is the location of the greatest radial loading in a gas turbine engine of the sort described. Since roller bearings such as the bearings 16 are not capable of absorbing substantial thrust, the ball bearing 18 is employed as a thrust bearing.

As an alternative, a bearing such as the tapered roller bearing illustrated in FIG. 5 which is capable of handling both radial loading and thrust loading may be employed. As illustrated therein, a tapered roller bearing element 110 includes stub shafts 112 and 114 extending in opposite directions and located about the rotational axis 116 of each element 110 to be received in bores in a cage 118 employed to separate the elements 110 circumferentially from each other. The cage 118 may be coupled to a tubular shaft 62 or the like by any suitable means. As illustrated in FIG. 5, the tapered roller bearing assembly also includes an outer race 120 and an inner race 122 defined by a surface of the shaft 12. This is to say, the races of any of the bearing forms disclosed need not be formed as elements separate from the shaft 12 or the various housing components but may, if desired be surfaces formed integrally thereon with appropriate surface treatment. Indeed, the shaft 12 with integral bearing races may be wholly formed of ceramic material as the invention contemplates the use of a rotor incorporating integral bearing races and which is completely formed of ceramic material.

From the foregoing, it will be appreciated that the invention provide a means whereby a low speed rotational power may be got as a result of rotation of a high speed shaft without the use of a speed reducing transmission having gears or the like. Consequently, the cost of fabrication, bulk and weight of such transmissions is avoided in a relatively simple system.

We claim:

1. A power plant comprising:
    a gas turbine engine having a high speed output shaft;
    at least one bearing journalling said shaft and having
        a bearing cage rotatable relative to said shaft at a speed less than said high speed, said bearing cage being driven by substantially epicyclic movement of bearing elements of said bearing when said high speed shaft is driven; and
    a load coupled to said bearing cage to be driven thereby.

2. The power plant of claim 1 wherein said load is a ducted fan.

3. A power plant comprising:
    a gas turbine engine having a high speed output shaft;
    at least one bearing journalling said shaft and having
        a bearing cage rotatable relative to said shaft at a speed less than said high speed, said bearing cage being driven by epicyclic movement of bearing elements of said bearing when said high speed shaft is driven; and
    a dynamoelectric device having a rotor coupled to said bearing cage.

4. The power plant of claim 3 wherein said dynamoelectric device can be driven by said bearing cage and act as an electrical generator or drive said bearing cage when connected to a source of electrical power to serve, as a starter for said gas turbine engine; and further including a source of electrical power for said dynamoelectric device.

5. The power plant of claim 4 further including a ducted fan coupled to said bearing cage to be driven thereby.

6. A gas turbine engine including:
    a compressor;
    a turbine wheel;
    a shaft coupling said compressor and said turbine wheel;
    a bearing journalling said shaft for rotation about an axis and including
        an inner race,
        an outer race,
        bearing elements between said races, and a
        bearing cage for separating said bearing
        elements between said races;
    a combustor located to receive compressed air from said compressor and fuel from a source and provide gases of combustion for driving said turbine wheel;
    a load to be rotationally driven at a rate less than the rotational rate of said shaft; and
    speed reduction means interconnecting said shaft, and said load, and comprising means coupling said cage and said load.

7. The gas turbine engine of claim 6 wherein said load is an electric generator having a rotor and said coupling means connects said rotor to said cage.

8. The gas turbine engine of claim 7 wherein said rotor includes a permanent magnet array.

9. The gas turbine engine of claim 6 further including a housing for said turbine engine; said load comprising fan and said housing defining a duct for said fan to thereby provide a ducted fan engine.

10. The gas turbine engine of claim 6 wherein said cage includes a circular element disposed about said shaft and between said races, and having a plurality of bearing element capturing openings about its periphery, one for each bearing element, and said coupling means comprises a tube located about said shaft and connected to said bearing cage.

11. The gas turbine engine of claim 6 wherein there are two said bearings in axially spaced relation along said shaft and said coupling means comprises a tubular shaft surrounding said shaft and extending between the cages of both said bearings.

12. The gas turbine engine of claim 11 wherein said tubular shaft further defines at least one of said bearing cages.

13. The gas turbine engine of claim 6 wherein said bearing is located on the side of said compressor opposite of said turbine wheel.

* * * * *